US012665909B2

(12) United States Patent
Karakoc et al.

(10) Patent No.: US 12,665,909 B2
(45) Date of Patent: Jun. 23, 2026

(54) FEDERATED LEARNING PROCESS

(71) Applicant: Telefonaktiebolaget LM Ericsson (publ), Stockholm (SE)

(72) Inventors: Ferhat Karakoc, Istanbul (TR); Elif Ustundag Soykan, Stockholm (SE); Leyli Karacay, Istanbul Ümraniye (TR); Pinar Çomak De Cnudde, Berlare (BE); Ramin Fuladi, Istanbul (TR); Utku Gülen, Kadköy (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/722,987

(22) PCT Filed: Dec. 23, 2022

(86) PCT No.: PCT/TR2022/051579
§ 371 (c)(1),
(2) Date: Jun. 21, 2024

(87) PCT Pub. No.: WO2023/121635
PCT Pub. Date: Jun. 29, 2023

(65) Prior Publication Data
US 2025/0150462 A1 May 8, 2025

Related U.S. Application Data

(60) Provisional application No. 63/293,472, filed on Dec. 23, 2021.

(51) Int. Cl.
| | |
|---|---|
| H04L 9/40 | (2022.01) |
| G06N 20/00 | (2019.01) |
| H04L 9/06 | (2006.01) |

(52) U.S. Cl.
CPC ......... H04L 63/1408 (2013.01); G06N 20/00 (2019.01); H04L 9/0643 (2013.01)

(58) Field of Classification Search
CPC . H04L 63/1408; H04L 9/0643; H04L 9/0891; H04L 9/0894; H04L 67/10;
(Continued)

(56) References Cited

U.S. PATENT DOCUMENTS

| | | | |
|---|---|---|---|
| 11,050,723 B1 | 6/2021 | Mahdavi et al. | |
| 11,743,001 B2 * | 8/2023 | Jiang .................... | H04L 1/0091 |
| | | | 714/748 |

(Continued)

FOREIGN PATENT DOCUMENTS

| | | |
|---|---|---|
| WO | 2021032495 A1 | 2/2021 |
| WO | 2021070189 A1 | 4/2021 |

(Continued)

OTHER PUBLICATIONS

Abe, Masayuki, et al., "How to date blind signatures", Asiacrypt 1996: Advances in Cryptology, https://link.springer.com/chapter/10.1007/BFb0034851, 1996, pp. 1-4.

(Continued)

*Primary Examiner* — Michael Won
(74) *Attorney, Agent, or Firm* — Sonoda & Kobayashi Intellectual Property Law; Sarvajit S. Patil

(57) ABSTRACT

According to a first aspect there is a method performed by a detector node in a communications network, wherein the detector node is for monitoring messages sent between a first client node, a second client node and a Federated Learning, FL, server, as part of a FL process wherein, as part of the FL process, the first client node sends a local model update to the second client node for forwarding to the FL server. The method comprising: receiving first information relating to the local model update sent from the first client node to the
(Continued)

second client node; receiving second information relating to the local model update as received or forwarded by the second client node; and comparing the first information to the second information to determine whether the second client node correctly received or forwarded the first information relating to the local model.

19 Claims, 10 Drawing Sheets

(58) Field of Classification Search
CPC ... H04L 67/56; H04L 9/3257; H04L 63/1441;
G06N 20/00
See application file for complete search history.

(56) References Cited

U.S. PATENT DOCUMENTS

| | | | | |
|---|---|---|---|---|
| 2013/0238794 | A1* | 9/2013 | Ng | H04L 63/0272 |
| | | | | 709/224 |
| 2013/0311140 | A1* | 11/2013 | Schechter | H04L 67/34 |
| | | | | 702/188 |
| 2016/0050264 | A1* | 2/2016 | Breed | H04L 67/564 |
| | | | | 709/217 |
| 2020/0027022 | A1 | 1/2020 | Jha et al. | |
| 2021/0203682 | A1* | 7/2021 | Bajpai | H04L 63/0435 |
| 2022/0374763 | A1* | 11/2022 | Gu | G06N 3/09 |
| 2023/0162047 | A1* | 5/2023 | Mortazavi | G06N 3/0985 |
| | | | | 706/15 |
| 2024/0296342 | A1* | 9/2024 | Isaksson | G06N 3/098 |
| 2025/0068928 | A1* | 2/2025 | Mckelvey | H04L 9/50 |
| 2025/0119296 | A1* | 4/2025 | Soykan | G06N 20/00 |
| 2025/0232216 | A1* | 7/2025 | Rydén | G06N 20/00 |

FOREIGN PATENT DOCUMENTS

| | | | |
|---|---|---|---|
| WO | 2023030730 A1 | 3/2023 | |
| WO | WO-2023121635 A1 * | 6/2023 | ........... H04L 9/0643 |

OTHER PUBLICATIONS

Abe, Masayuki, et al., "Provably Secure Partially Blind Signatures", Advances in Cryptology—Asiacrypt '96. Asiacrypt 1996. Lecture Notes in Computer Science, vol. 1163. Springer, Berlin, Heidelberg, 1996, pp. 272-287.

Blanco-Justicia, Alberto, et al., "Achieving Security and Privacy in Federated Learning Systems: Survey, Research Challenges and Future Directions", Engineering Applications of Artificial Intelligence 106(7), Nov. 2021, pp. 1-40.

Buccafurri, Francesco, et al., "Analysis-preserving protection of user privacy against information leakage of social-network Likes", Information Sciences 328, http://dx.doi.org/10.1016/j.ins.2015.08. 046, 2016, pp. 340-358.

Chaum, David, "Blind Signatures for Untraceable Payments", Advances in Cryptology, Springer, Boston, MA; https://doi.org/10.1007/978-1-4757-0602-4_18, Jan. 1, 1982, pp. 199-203.

Domingo-Ferrer, Josep, et al., "Co-Utility: Self-Enforcing Protocols for the Mutual Benefit of Participants", Engineering Applications of Artificial Intelligence, Jan. 9, 2017, pp. 1-30.

Fan, Chun-I, et al., "Strongly Privacy-Preserving Communication Protocol for VANETs", 2014 Ninth Asia Joint Conference on Information Security, 2014, pp. 119-126.

Gong, Yanmin, et al., "A Privacy-Preserving Scheme for Incentive-Based Demand Response in the Smart Grid", IEEE Transactions on Smart Grid 7, 2016, pp. 1-12.

Li, Qinghua, et al., "Privacy-preserving participatory sensing", IEEE Communications Magazine, vol. 53 Issue: 8, https://ieeexplore. ieee .org/document/7180510, Aug. 6, 2015, pp. 1-6.

Oriero, Enahoro, et al., "Privacy Preserving Fine-Grained Data Distribution Aggregation for Smart Grid AMI Networks", https:// www.researchgate.net/publication/330119758, Oct. 2018, pp. 1-7.

* cited by examiner

600

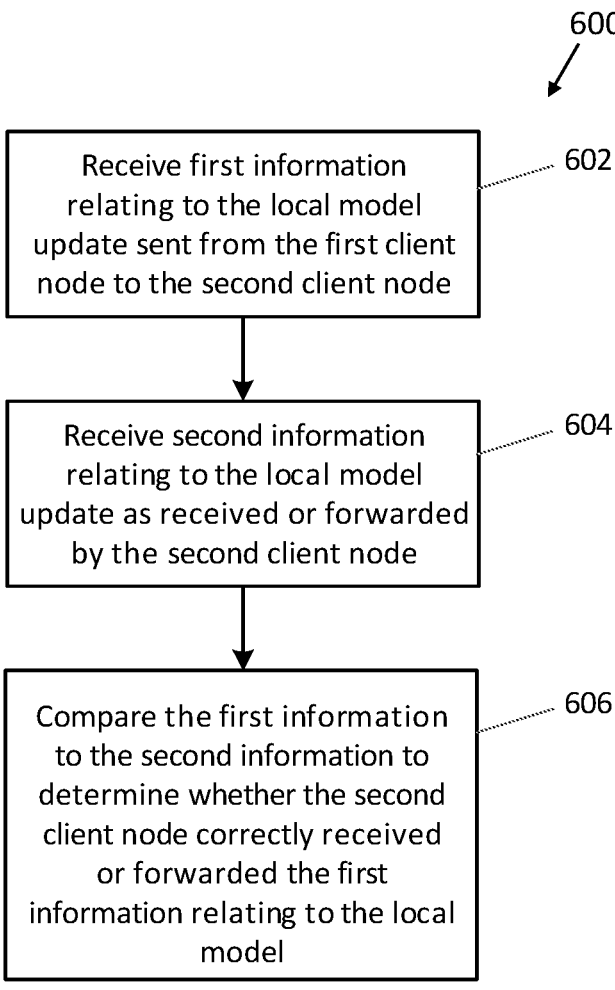

Receive first information
relating to the local model
update sent from the first client
node to the second client node

602

Receive second information
relating to the local model
update as received or forwarded
by the second client node

604

Compare the first information
to the second information to
determine whether the second
client node correctly received
or forwarded the first
information relating to the local
model

Send the local model update to the second client node for forwarding by the second client node to the FL server — 702

Send first information relating to the local model update to a detector node in the communications network — 704

800

Send second information relating to the local model update as received or forwarded by the second client node to a detector node

802

900

902

Receive the local model update from the second client node

904

Send third information relating to the local model update as received to a detector node or to the second client node

1000

1002

1004

1006

FEDERATED LEARNING PROCESS

The project leading to this application has received funding from the European Union's Horizon 2020 research and innovation program under grant agreement No 101015956.

TECHNICAL FIELD

This disclosure relates to methods, nodes and systems in a communications network. More particularly but non-exclusively, the disclosure relates to federated learning processes in a communications network.

BACKGROUND

Federated Learning (FL) is a privacy aware collaborative machine learning (ML) technique. In the setting of the technique, the participants are a server and clients. The server constructs a global ML model, and the clients help the construction of the model. The privacy enhancement in this technique is that the clients send some update parameters computed using their own data instead of sending their plain data to the server. FL works as follows: As a first step the server constructs an initial global ML model and then sends it to the clients. Each client trains the model using her own data to obtain local model update, and then sends the model update to the server. The server aggregates the local model updates to construct the global model. These steps are repeated until the global model converges.

Although the private data is not sent in cleartext to the server, there are some studies that show the local model updates that are sent to the server may leak some information about the private data of the clients. To prevent the leakage of information, usage of some privacy enhancing technologies such as homomorphic encryption, secure multi-party computation, and confidential computing have been proposed. One of the proposed solutions is the usage of secure aggregation. In secure aggregation methods, the clients encrypt their updates and then send the encrypted updates to the server. Then the server aggregates the encrypted updates and decrypts the aggregated result. In this way, the server cannot learn individual updates and can only learn the aggregated output.

While privacy enhancing technologies solve the privacy problems, these techniques make it difficult to prevent security attacks against the model construction, such as backdoor or poisoning attacks. The reason is that the server cannot analyze the data coming from the clients because the data is encrypted, and the server can learn only the aggregated result.

The paper by Alberto Blanco-Justicia et al. (2020) entitled: "Achieving Security and Privacy in Federated Learning Systems: Survey, Research Challenges and Future Directions" proposed a solution to solve the privacy issue without compromising the security protection mechanisms. According to their solution, when the sender of the data is anonymized to the server, then the server may not be able to leak information from the model updates coming from the clients. Below is an excerpt of the solution for the data sender anonymization:

"The basic idea is that, instead of each client always submitting her model updates directly to the FL server (which might leak her private data), she chooses to forward her model update to another client, that we call the forwardee. The forwardee may in turn decide to submit the updated model to the FL server or refuse to do it. If the forwardee refuses the request, the update originator tries another forwardee until someone submits her model update to the FL server. This single-hop approach protects the privacy of the update originator versus the FL server because the latter does not know who originated each received update, and further cannot link successive model updates by the same originator. The approach is single-hop, and it does not protect the privacy of clients versus each other (the forwardee knows who originated the received update). To fix this, we can generalize the idea into a multi-hop protocol, whereby a forwardee receiving a model update can submit it or forward it to yet another forwardee. Forwarding is an alternative to refusing the updated model. This multi-hop approach prevents privacy disclosure to both FL server and other clients because neither the FL server nor forwardees know whether they are receiving the model update from the originator or from another forwardee. Moreover, the successive model updates originated by the same client are unlinkable, which goes a long way towards guaranteeing that the private data sets of clients stay confidential. Peer-to-peer multi-hop protocols have been successfully applied to enhance privacy in other contexts, such as anonymous query submission to a web search engine (Domingo-Ferrer et al., 2017) . . . The proposed solution is satisfactory in terms of privacy with respect to both FL server and other clients. Unlike differential privacy, model updates are not perturbed and thus the accuracy of the model is entirely retained. Moreover, the fact that model updates are neither perturbed nor aggregated allows the FL server to compute statistics on the weights and biases of the client updates in order to detect and discard defective (or malicious) updates. The downside is that peer-to-peer forwarding of updates requires clients to communicate with each other and, therefore, introduces a communication overhead."

SUMMARY

The disclosure herein relates to protection of local model updates in multi-hop communication in federated learning.

According to a first aspect there is a method performed by a detector node in a communications network, wherein the detector node is for monitoring messages sent between a first client node, a second client node and a Federated Learning, FL, server, as part of a FL process wherein, as part of the FL process, the first client node sends a local model update to the second client node for forwarding to the FL server. The method comprising: receiving first information relating to the local model update sent from the first client node to the second client node; receiving second information relating to the local model update as received or forwarded by the second client node; and comparing the first information to the second information to determine whether the second client node correctly received or forwarded the first information relating to the local model.

According to a second aspect there is a method performed by a first client node in a communications network, wherein the first client node is involved in a Federated Learning, FL, process with a second client node and a Federated Learning, FL, server, wherein, as part of the FL process, the first client node sends a local model update to the second client node for forwarding to the FL server, the method comprising: sending the local model update to the second client node for forwarding by the second client node to the FL server; and sending first information relating to the local model update to a detector node in the communications network.

According to a third aspect there is a method performed by a second client node in a communications network, wherein the second client node is involved in a Federated Learning, FL, process with a first client node and a Federated Learning, FL, server, wherein, as part of the FL process, the first client node sends a local model update to the second client node for forwarding to the FL server, the method comprising: sending second information relating to the local model update as received or forwarded by the second client node to a detector node.

According to a fourth aspect there is a method performed by a Federated Learning server, FL server, wherein the FL server is involved in a Federated Learning, FL, process with a first client node and a second client node, wherein, as part of the FL process, the first client node sends a local model update to the second client node for forwarding to the FL server, the method comprising: receiving the local model update from the second client node; and sending third information relating to the local model update as received to a detector node or to the second client node.

According to a fifth aspect there is a detector node configured to perform the first aspect.

According to a sixth aspect there is a first client node configured to perform the second aspect.

According to a seventh aspect there is a second client node configured to perform the third aspect.

According to a eighth aspect there is a Federated Learning, FL, server configured to perform the fourth aspect.

According to a tenth aspect there is computer program product comprising a computer readable medium, the computer readable medium having computer readable code embodied therein, the computer readable code being configured such that, on execution by a suitable computer or processor, the computer or processor is caused to perform the method of any one of the first four aspects.

According to an eleventh aspect there is a computer program comprising instructions which, when executed on at least one processor, cause the at least one processor to carry out a method according to any of the first four aspects.

According to an twelfth aspect there is a carrier containing a computer program according to aspects ten or eleven, wherein the carrier comprises one of an electronic signal, optical signal, radio signal or computer readable storage medium.

According to a thirteenth aspect there is a computer program product comprising non transitory computer readable media having stored thereon a computer program according to aspect ten or eleven.

Embodiments herein thus advantageously enable detection of nodes that are dropping packets instead of forwarding them in a multi-hop FL process. Thus, it can be ensured that all local model updates (local models) arrive to the FL server.

BRIEF DESCRIPTION OF THE DRAWINGS

For a better understanding and to show more clearly how embodiments herein may be carried into effect, reference will now be made, by way of example only, to the accompanying drawings, in which:

FIG. 6 shows a method according to some embodiments;

DETAILED DESCRIPTION

Figure 1:
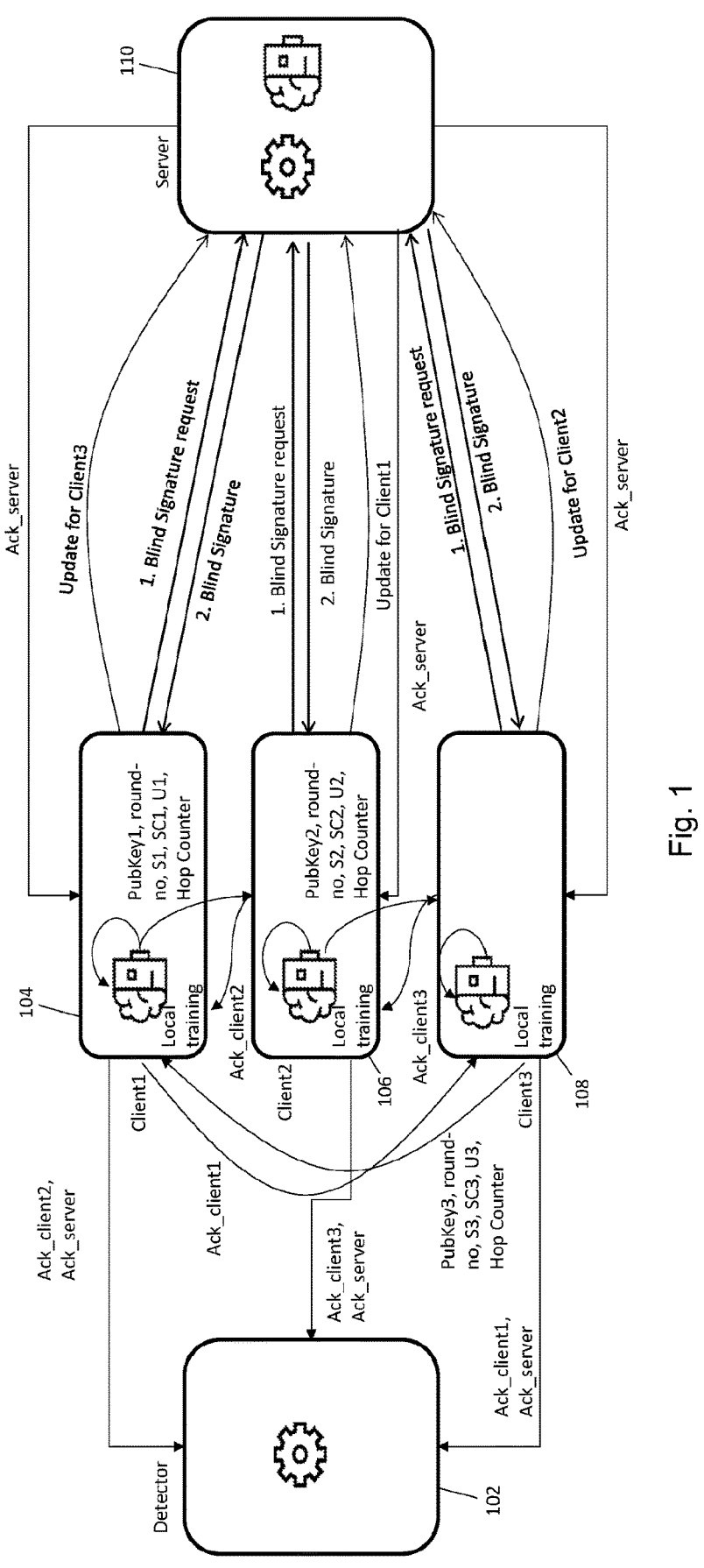
FIG. 1 shows a signal flow diagram in some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provide methods and apparatuses for performing federated learning with a server and a plurality of client devices in a communications network.

Generally, the disclosure herein relates to a communications network (or telecommunications network). A communications network may comprise any one or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that the communications network may comprise other types of links. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, 5G, 6G standards, or any future standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

As described above, this disclosure relates to the use of multi-hop communication in federated learning, such as the solution provided by Alberto et al. (2020) cited above.

As noted in the background, while privacy enhancing technologies can solve privacy problems associated with FL, these techniques make it difficult to prevent security attacks against the model construction, such as backdoor or poisoning attacks. The reason is that the server cannot analyze the data coming from the clients because the data is encrypted, and the server can learn only the aggregated result.

The paper by Alberto Blanco-Justicia et al. (2020) proposed a method to solve the privacy issue without compromising the security protection mechanisms.

However, in the Alberto et al. FL solution, other problems may also arise, for example, a malicious client may send the same model updates more than once (thereby biasing the resulting global ML model). In some examples, a malicious client may drop the model updates received from other client nodes. In some examples, a malicious client (e.g., "malicious forwardee") may alter a local model update received from another client.

Another study (TR/2021/013845) added to the solution of Alberto et al. (2020) by introducing blind signatures to the method of Alberto et al. (2020).

Blind signatures were first introduced by David Chaum in 1983 (Chaum, David (1983) entitled: "Blind signatures for untraceable payments". *Advances in Cryptology Proceedings of Crypto*. 82 (3): 199-203). This type of signature schemes allow one party to have a signature (sign(x)) for its private data (x) from an signature issuer without leaking any information about the data. Chaum proposed to use this approach for untraceable payments.

The blind signature protocol (as described in the above reference paper) is as follows:

Functions

Blind Signature systems might be thought of as including the features of true two key digital signature schemes combined in a special way with commutative style public key systems. A modified version of the blind signature protocol described in the above referenced paper will now be described. The following functions make up the blind signature cryptosystem:

1) A private signature function, s' known only to the signer, and the corresponding public verification function, s, where s (s'(x))=x, and s gives no clue about s'.

2) A commuting function c and its inverse c', both known only to the provider, such that c'(s'(c(x)))=s'(x), and c(x) and s' give no clue about x.

Protocol

1) The provider chooses x at random, forms c(x), and supplies c(x) to the signer.

2) The signer signs c(x) by applying s' and returns the signed matter s'(c(x)) to the provider.

3) The provider strips the signed matter by applying c', yielding c'(s'(c(x)))=s'(x)

4) Anyone may then check that the stripped matter s'(x) was formed by the signer by verifying, using x and the signer's public verification function s, that s'(x) was generated from s' and x, wherein s corresponds to the s', where s (s'(x))=x.

Partially blind signatures are also available. Partially blind signatures enable the signature issuer (which for embodiments descibred herein may be the server) to input additional information into the data before signing the data of the consumer (which for embodiments descibred herein may be the client nodes). In other words, if x is the data of the client node and y is the data of the FL server, after running the protocol for the blind signature, the client node may learn the signature of (x,y) and the FL server learns nothing about x. The notion of partially blind signatures was introduced by Abe M., Fujisaki et al. in their paper titled "How to date blind signatures" In: Kim K., Matsumoto T. (eds) Advances in Cryptology—ASIACRYPT '96. ASIACRYPT 1996. Lecture Notes in Computer Science, vol 1163. Springer, Berlin, Heidelberg.

In Abe, Masayuki and T. Okamoto. "Provably Secure Partially Blind Signatures." CRYPTO (2000), secure and efficient partially blind signature schemes were proposed.

After these studies on partially blind signatures were published, many constructions using different tools such as Rivest-Shamir-Adleman (RSA) or Elliptic Curve Digital Signature Algorithm (ECDSA), bilinear parings etc. have been proposed to realize the partially blind signatures. The main application areas of these partially blind signatures has been electronic cash systems and electronic voting.

Usage of Blind Signatures and Multi-Hop Communication in Federated Learning

PCT/EP2022/069281 (TR 2021/013845) introduced the idea of usage of blind signatures in the solution proposed by Alberto et al. where multi-hop communication is used to hide the owners of the model updates towards to the server. The reason of the usage of blind signature is to address the following problems in the Alberto et al. solution:

A malicious client can send same model updates more than once.

A malicious forwardee client can alter the update because of lack of integrity protection.

PCT/EP2022/069281 (TR 2021/013845) also used the approach that the server may use the local model updates from the clients even though local model updates have not been received from all the clients in the setting. With this approach, the denial-of-service attack by malicious forwardee clients, who may drop the received local model updates, can be prevented.

Even with the use of blind signatures, various problems may remain. For example, a malicious forwardee client can drop local model updates of other clients, and thus skew the results of the Federation. Furthermore, a malicious forwardee client may cause a denial-of-service attack, if the number of local model updates coming to that forwardee client is larger than the tolerable number of lost local model updates, because when that forwardee client drops all these packets, the server will not be able to continue to the FL round and have to restart the round.

The disclosure herein aims to address these possible issues, amongst others, by detecting malicious forwardee clients who drop or alter packets.

Some of the embodiments herein may be summarized as follows:

Ack (acknowledgement) packets may be introduced such that when a forwardee client receives a packet (including a local model update), that client has to send a signed ack packet to the sender client. If the sender client doesn't receive an ack packet, then the sender chooses another forwardee client randomly to send the packet. After the FL round ends, each client sends the ack packets received from forwardee clients to a node referred to herein as a "detector node". The detector performs the following action for each client. It checks if the client has sent all the packets received from other clients. If the check fails, then it means that the client has dropped some packets.

Thus, as described in more detail below, a method may comprise:

Introduction of a new entity ("detector" node).

When a forwardee client receives a packet, it sends an ack packet to sender client.

Sending the received ack packets by the sender clients to the detector. Or, sending from the sender clients, the received ack packets to the detector.

Analyses of these ack packets by the detector to detect, if there is any client who have dropped any packets.

Alternatively or additionally, the sender client may send a message containing sender client ID, forwardee client ID and hash of the packet, sent to the forwardee client, to the detector whenever it transmits a packet including a local model update to a forwardee client. In this way, the detector will have the information of forwardee client ID, sender client ID and the hash of the packet. The detector tracks this information to ensure there's no packet drop. Accordingly, whenever a forwardee client receives a packet, it sends a message to the detector with same information, forwardee and sender client IDs and hash of the packet, to inform a packet has been received. Then the detector checks the messages and if they match, it sends an ack packet to the sender client which means the packet transmission has been completed successfully. Otherwise, if sender client doesn't get an ack message from the detector, sender client executes same steps for a randomly chosen forwardee client.

Thus, as described in more detail below, a method may comprise:

Introduction of a new entity ("detector node")

Sending information messages by the sender and/or forwardee clients to the detector whenever a packet has been sent/received Steps to ensure that if a packet dropped by a client, the detector detects the drop immediately in each packet transmission.

The Examples summarized above address some of the issues associated with multi-hop federated learning. Particularly, but non-exclusively, multi-hop federated learning where blind-signatures are used. For example, embodiments here allow a FL server to analyze the data gathered from the clients without compromising their privacy so that security attacks stemming from malicious clients such as backdoor or data poisoning can be detected, which is hard with cryptographic privacy methodologies (HE, SMPC), even in the case where there is a malicious forwardee who wants to drop packets and/or prevent execution of federated learning. Furthermore, since the proposed solutions allow detection of malicious clients who drop some packets, it allows the system to exclude the malicious client from the FL process.

In some embodiments herein there are methods performed by a first client node, a second client node, a detector node and a FL server in a communications network. The detector node is for monitoring messages sent between the first client node, the second client node and the FL server, as part of a multi-hop FL process in which the first client node trains a copy of the global model on local data to produce a local model, and sends a local model update to the second client node for forwarding to the FL server.

FL learning may refer to any distributed learning process whereby training on local copies of a model on a plurality of client nodes is consolidated into a global model by a FL server. As used herein the FL server (which may also be referred to herein as the "server") may refer to a central server, or "master" of the FL process. The first client node and the second client node referred to herein may be "workers" or "slave" nodes in the FL process.

It will be appreciated that although the examples herein may be described in terms of first and second client nodes that there may be a plurality of N client nodes in the FL process. The FL process is a multi-hop process whereby client nodes forward their local model updates to the FL server through (e.g. via) other client nodes involved in the FL process.

Notation: We use the same notation and transformations (c, c', s, s') for the following steps as in the solution of Chaum (1983) referenced above for blind signatures for simplicity. Note that the redundancy function r used in the Chaum blind signature protocol may not be used herein. Also, in the partial signature scheme, the server may include/comprise the round number somehow depending on the construction of the partial signature scheme. We use the following notation for the conventional signature schemes:

Signature operation to compute the payload signature for a payload using private key priv_key of the signer: Sign (payload, priv_key)->payload signature Verification of the payload signature using the payload, payload signature and public key pub_key of the signer: Verify (payload, payload signature, pub_key)->ok/nok The parties in a federated learning (FL) system are a server and clients where the aim is to construct a machine learning (ML) model using clients' data without revealing the data to each other and to the server. In the classical FL setting, the clients only communicate with the server. In our setting, the clients can also communicate with each other in addition to communicating with the server. For the detection of malicious clients who drop packets, there is also a new entity, referred to herein as a detector or detector node, introduced herein.

Figure 2:
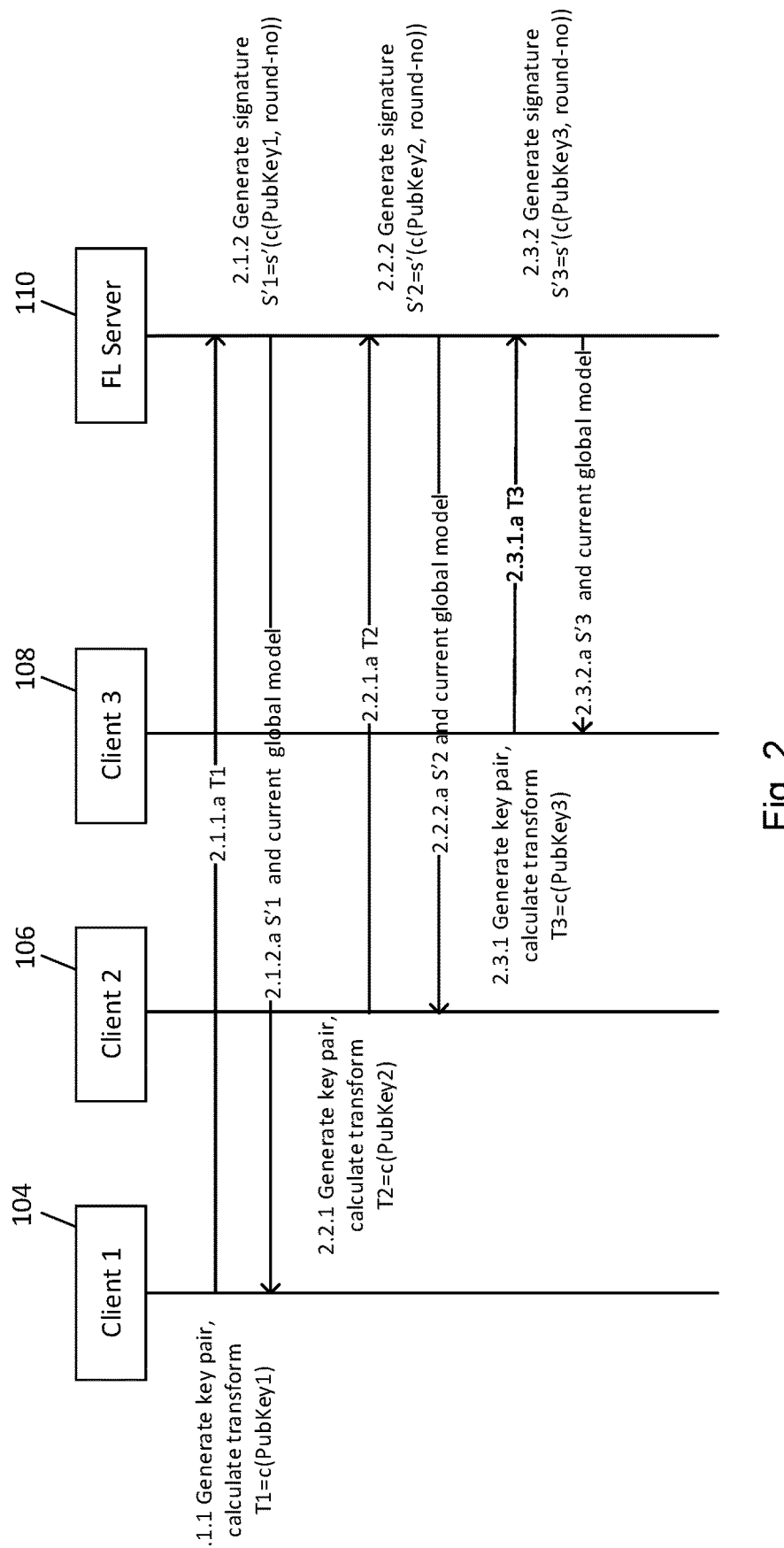
FIG. 2 shows a signal diagram according to some embodiments.
Figure 3:
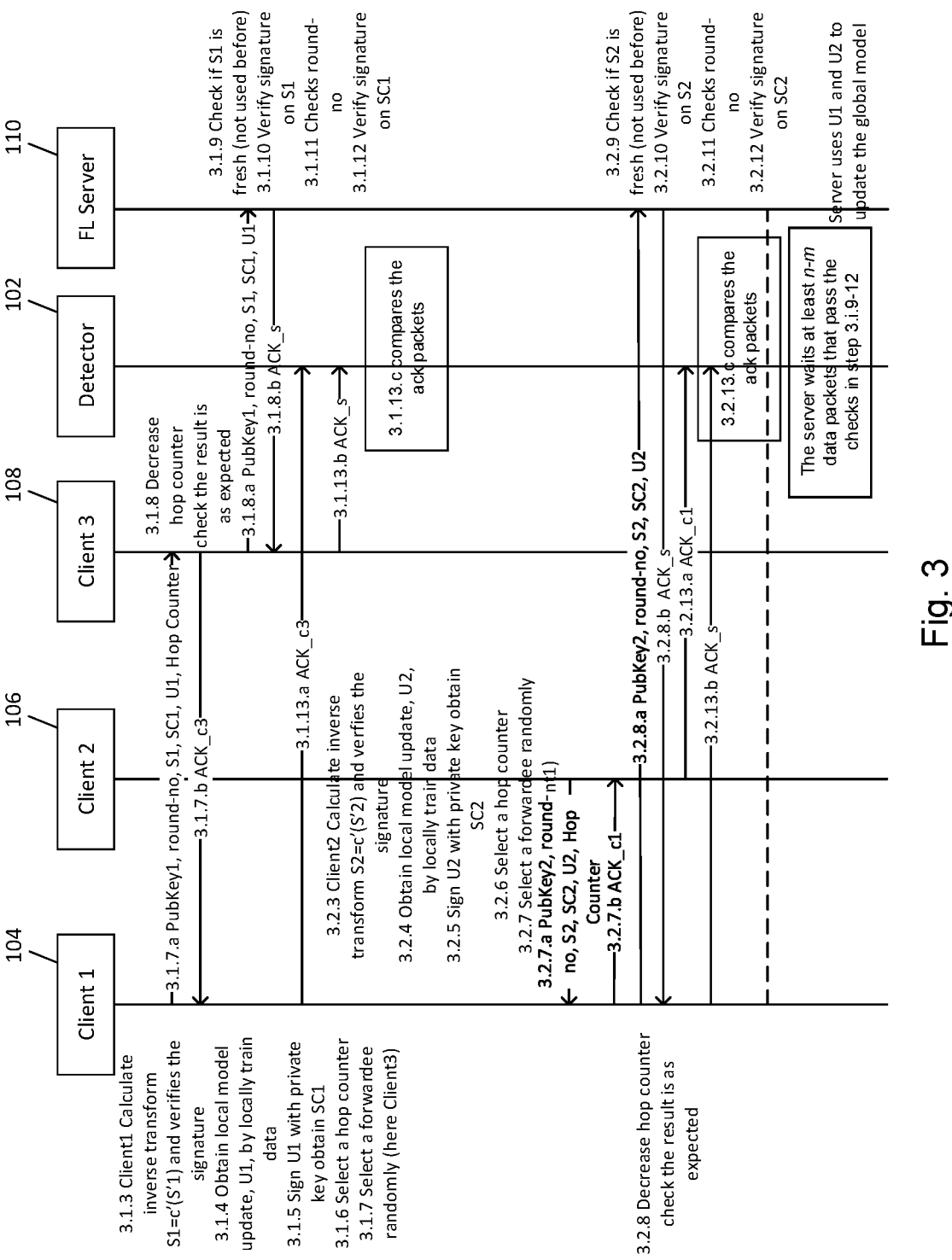
FIG. 3 shows a signal diagram according to some embodiments.

An example method of performing multi-hop Federated Learning using blind signatures according to some embodiments herein is illustrated in FIGS. 1, 2 and 3.

FIG. 1 shows example interactions between Server 110, Clients 104, 106, 108 and Detector 102.

FIG. 2 shows observing current global ML model and signed public keys from the server in one round of FL. Note that the order of steps 2.1, 2.2 and 2.3 can be in any order or in parallel. Also note that, FIG. 2 shows an example for 3 clients, the number of clients can be any number. Note that the algorithm used to insert the round-no in the data to be signed in step 2.1.2, 2.2.2, and 2.3.2 depends on the used partially blind signature scheme. FIG. 3 shows sending local model updates to the server hop-by-hop in one round of FL. Note that this flow just a simulation of the flow. A client/forwardee can select next forwardee randomly. Also note that for simplicity, the steps for client 3 are not depicted in the Fig, however similar steps may be performed by client 3.

In more detail, FIG. 1 shows example messages sent between a Detector Node 102, a first client node 104, a second client node 106, a third client node 108 and a FL server 110. It will be appreciated that three client nodes is merely an example and that the examples herein may be generalized to N client nodes and to a FL process involving m hops (or forwards of the updated local model) between the client node that obtained the local model update and the FL server.

In the example in FIG. 1, the following steps are executed in each round of Federated Learning. Note that one round in usual federated learning often has the following steps:

the server sends the current global model to all clients, the clients update the received model using their private data to compute local model updates (Note that the client can send the newly computed local model (called as "local model") or the difference between the newly computed local model and the received global model (the difference is called as "local model update") depending on the federated learning settings. The solutions herein work regardless of sending local model or local model updates. The local model and local model updates are used throughout the document.), the clients send the local models or local model updates to the server, the server aggregates the local models (local model updates) to produce an updated global model.

As described above, in the proposal of Alberto et al. (https://arxiv.org/abs/2012.06810), use of multi-hop was presented as a solution to prevent the server from learning the matching of local model updates and clients.

In the system initialization (determination of transformations), to prevent cheating by the server by using different secret keys, for each client in the signature scheme (s'), the clients can communicate with each other to check that the corresponding verification public key in the verification transformation(s) is same for each client. With this check the clients ensure that the memoryless property is satisfied (for the memoryless property for blindness, the secret key should stay the same throughout the protocol).

System parameters: An interval for the initial hop-counter chosen by the clients. A threshold to test the hop-counter value in the received packet when the forwardee decides on if the data packet shall be sent to the server. These parameters can be sent to the clients during initialization of the Federated learning process as illustrated in FIG. 2.

1. Each client generates a public-private key pair (PubKey$_i$, PrivKey$_i$ for the i-th client) and sends the output of the transformation T$_i$=c (PubKey$_i$) to the server as seen in step 2.*i*.1 and 2.*i*.1.*a* in FIG. 2.

2. The server signs the received transformation result T/using a signature algorithm s' and sends the result S'$_i$=s'(c (PubKey$_i$, round-no)) with the current global model to the i-th client as seen in step 2.*i*.2 and 2.*i*.2.*a* in FIG. 2. Note that the algorithm used to insert the round-no in the data to be signed depends on the used partially blind signature scheme.

3. Each client strips signed matter by applying inverse transformation of c (c') to have the signature of the data, i.e., S$_i$=c'(S'$_i$)=c'(s'(c (PubKey$_i$, round-no)))=s' (PubKey$_i$, round-no) in step 3.*i*.3 in FIG. 3. And also checks the signature to ensure that the signature verification transformation (public key) identified in the system initialization is used. If the verification fails, it implies that the server is cheating and using a different secret key to break the anonymity. If the check is successful, the client performs local training to obtain the local model (U$_i$) (step 3.*i*.4 in FIG. 3).

4. Each client signs the local model (U$_i$) using its private key (PrivKey$_i$) to obtain local model signature (SC$_i$) (in step 3.*i*.5 in FIG. 3), selects a random hop-counter between a predetermined interval (in step 3.*i*.6 in FIG. 3). Then, sends its public key, round-no, server's signature on the public key and round-no, local model signature, the local model, and the hop-counter (PubKey$_i$, round-no, S$_i$, SC$_i$, U$_i$, hop-counter) to a randomly selected forwardee (selected in step 3.*i*.7 in FIG. 3) as seen in step 3.*i*.7.*a* in FIG. 3. Note that in some embodiments, the client may be flexible not to use a forwardee and could directly sent to the FL server 110.

The client waits for an acknowledgement (ack) packet (step 3.*i*.7.*b* in FIG. 3). If the client doesn't receive an ack packet then it randomly chooses another client and sends the same packet (PubKey$_i$, round-no, S$_i$, SC$_i$, U$_i$, hop-counter).

5. After receiving a packet, the forwardee client (e.g. clients 2 or 3 in FIG. 3) sends an acknowledgement packet to the previous forwardee client in the communication path to acknowledge that the packet has been received (step 3.*i*.7.*b* in FIG. 3). Note that the previous forwardee client in the path can be the owner of the packet. The acknowledgement packet is a signed packet by the forwardee client, where the signature is computed on H (PubKey$_i$, round-no, S$_i$, SC$_i$, U$_i$) and H is a hash function. Then, the forwardee decreases the hop-counter in the received packet by 1 and checks whether the result equals to or less than a predetermined value (step 3.*i*.8 in FIG. 3). Note that the predetermined value is a parameter fixed at the beginning of FL and known by all the clients. If the check is successful, the forwardee sends the received public key, round-no, server's signature on the public key and round-no, the local model signature, and the local model to the server as seen in step 3.*i*.8.*a* in FIG. 3. If the check is unsuccessful, the forwardee sends the received public key, round-no, server's signature on the public key and round-no, the local model signature, the local model, the new hop-counter to a randomly selected forwardee. Note that the forwardee can send the packet to the server while the hop-counter is bigger than the threshold value. The forwardee waits for an acknowledgement (ack) packet (step 3.*i*.8.*b* in FIG. 3). If the forwardee doesn't receive an ack packet, then it randomly chooses another client and sends the same packet.

Note that, 3.*i*.7.*b* could also be executed after steps 3.*i*.8 and 3.*i*.8.*a*.

6. When the server 110 receives a packet, the server sends an acknowledgement packet to the forwardee client (client 3 or client 2 as illustrated in FIG. 3), who is the last forwardee client in the communication path and has sent the packet to the server, to acknowledge that the packet has been received (step 3.*i*.8.*b* in the FIG. 3). The acknowledgement packet is a signed packet by the server, where the signature is computed on H (PubKeyi, round-no, Si, SCi, Ui) and H is a hash function. Then the server executes the following steps:

a. Checks whether the public key is in the table (a table that stores the received public keys) to ensure that a public key can be used only once. If it is on the table, the server drops the received data without processing it (step 3.*i*.9 in FIG. 3).

b. Verifies the signature of the received public key ($S_i$). If the signature is valid then stores the public key in the table with the round-no. Otherwise, drops the received data without processing it (step 3.*i*.10 in FIG. 3).

c. Checks whether the round-no is correct. Note that the server knows the current round no in FL and compares the FL round no with the received round-no (step 3.*i*.11 in FIG. 3).

d. Verifies the local model signature. If the signature is valid, the server stores or processes the local model to compute the new global model. Otherwise, drops the received data without processing it (step 3.*i*.11 in FIG. 3).

Note that, 3.*i*.8.*b* could also be executed after steps 3.*i*.9-3.*i*. 12.

7. The server waits at least n-m data packets that pass the checks in step 6 where n is the number of clients and n-m is the number of clients required in the computation of the update of the global model. If that number is reached in the predefined time period, then the next round starts with step 1. The reason why we set a number 'm' is as follow: This solution allows execution of FL when at most m local model updates can be computed illegitimately by the m malicious clients who may want to prevent execution of FL.

8. Each client/forwardee sends the received ack packets to the Detector. Note that sending the ack packet can be done at the end of each FL round, or the clients send the ack packets to the Detector after receiving the packets.

9. The detector analysis the received ack packets to decide any anomaly/malicious behavior during the packet transfers in FL round. For example, the Detector executes the following check for each client. Detector compares the ack packets sent by that client and the ack packets received by that client. When the ack packets are matched, there should be only one ack packet left which received by that client for its own local model.

Note that in the solution it is assumed that the detector and the server don't collude. Otherwise, the server will be able to learn the identities of the clients for the local models because the detector can track the data flow by using the ack packets.

It may be ensured the detector and FL server are not able to collude in various ways. One example is that the detector node and FL server may be provided by different service providers or domains. The skilled person will appreciate that this is merely an example however and that the collusion (or lack thereof) may be monitored and/or enforced in a variety of different manners.

The signature algorithms used to sign ack packets are conventional signature algorithms, not blind signature algorithms.

In PCT/EP2022/069281 (TR 2021/013845), the idea can solve the problem of packet drops by malicious clients by setting m=0. In this case (m=0), the server will wait to receive packets from all the clients in each FL round. A client will be able to send only one packet due to the usage of blind signature. Since server waits n packets, a packet drop by a malicious client will halt the execution of the FL round and the server will restart the FL round after a predefined time period. However, setting m=0 allows malicious clients to execute a DOS attack because dropping at least one packet will lead the server to wait for n packets and restart the round because of missing packets. Thus, m can be tuned considering the number of packets allowed to be dropped and the possibility of DoS attacks. According to embodiments herein, m can be chosen as 0 safely because when a malicious client drops a packet, it will be detected by the detector and the client will be excluded from the setting. But if the malicious client computes its local model signature illegitimately, then the client may prevent execution of FL if m=0. To prevent this DoS attack, m can be tuned considering possible number of malicious clients.

Also note that, to prevent traffic analysis, clients can use garbled data and random delays before forwarding the incoming data packets.

Figure 4:
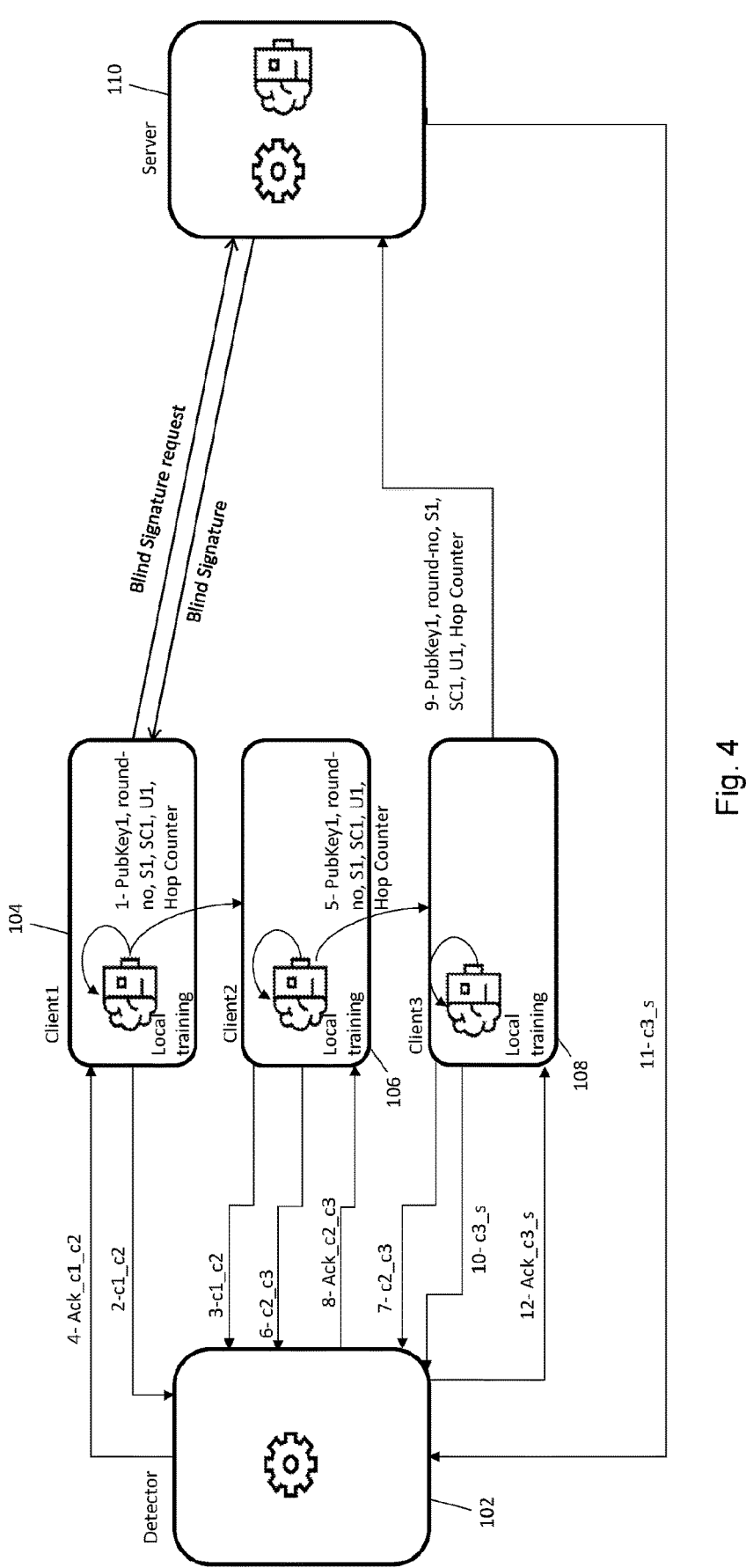
FIG. 4 shows a signal flow diagram according to some embodiments.
Figure 5:
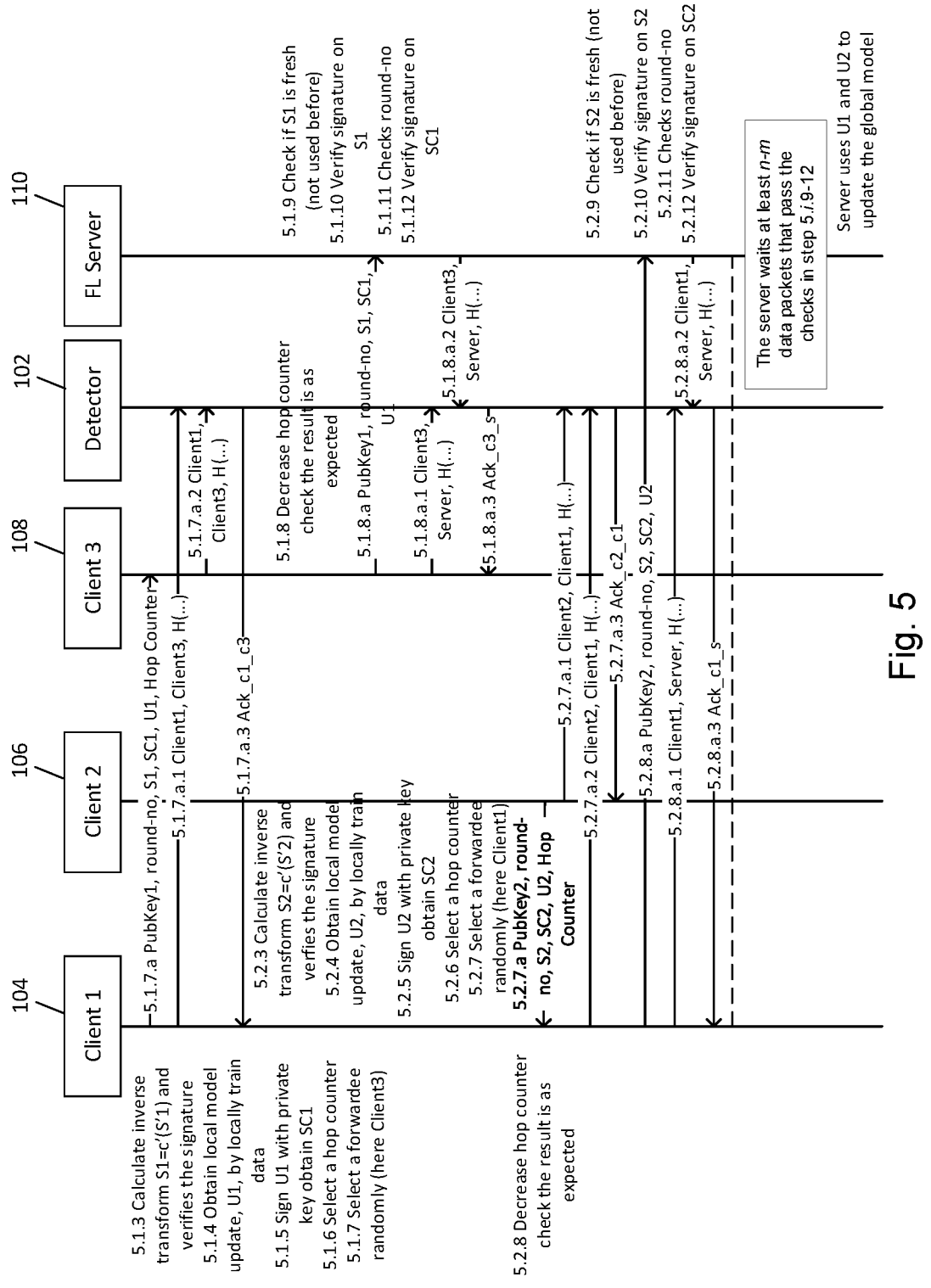
FIG. 5 shows a signal diagram according to some embodiments.

Turning now to another embodiment, as illustrated in FIGS. 4, and 5. FIG. 4 shows example interactions between Server 110, Clients 104, 106, 108 and Detector 102. Note that only the packet flow for Client1 data is shown as an example.

As in the embodiment described above with respect to FIGS. 1-3, the following steps are usually executed in each round of Federated Learning:

the server sends the current global model to all clients, the clients update the received model using their private data to compute local model updates (Note that the client can send the newly computed local model (called as "local model") or the difference between the newly computed local model and the received global model (the difference is called as "local model update") depending on the federated learning settings. The solutions herein work regardless of sending local model or local model updates. The local model and local model updates are used throughout the document.), the clients send the local models or local model updates to the server, the server aggregates the local models (local model updates) to produce an updated global model.

Also, in the proposal of Alberto et al. (https://arxiv.org/abs/2012.06810), use of multi-hop was presented as a solution to prevent the server from learning the matching of local model updates and clients.

In the system initialization (determination of transformations), to prevent cheating by the server by using different secret keys, for each client in the signature scheme (s'), the clients can communicate with each other to check that the corresponding verification public key in the verification transformation(s) is same for each client. With this check the clients ensure that the memoryless property is satisfied (for the memoryless property for blindness, the secret key should stay the same throughout the protocol).

System parameters: An interval for the initial hop-counter chosen by the clients. A threshold to test the hop-counter value in the received packet when the forwardee decides on if the data packet shall be sent to the server. These parameters can be sent to the clients during initialization of the Federated learning process.

1. Each client generates a public-private key pair ($PubKey_i$, PrivKey for the i-th client) and sends the output of the transformation $T_i$=c ($PubKey_i$) to the server as seen in step 2.*i*.1 and 2.*i*.1.*a* in FIG. 2.

2. The server signs the received transformation result $T_i$ using a signature algorithm s' and sends the result $S'_i$=s'(c ($PubKey_i$, round-no)) with the current global model to the i-th client as seen in step 2.*i*.2 and 2.*i*.2.*a* in FIG. 2. Note that the algorithm used to insert the round-no in the data to be signed depends on the used partially blind signature scheme.

3. Each client strips signed matter by applying inverse transformation of c (c') to have the signature of the data, i.e., $S_i=c'(S'_i)=c'(s'(c\ (PubKey_i,\ round-no)))=s'$ $(PubKey_i, round-no)$ in step 5.*i*.3 in FIG. 5. And also checks the signature to ensure that the signature verification transformation (public key) identified in the system initialization is used. If the verification fails, it implies that the server is cheating and using a different secret key to break the anonymity. If the check is successful, the client performs local training to obtain the local model update ($U_i$) (step 5.*i*.4 in FIG. 5).

4. Each client signs the local model update (U) using its private key ($PrivKey_i$) to obtain local model signature ($SC_i$) (in step 5.*i*.5 in FIG. 5), selects a random hop-counter between a predetermined interval (in step 5.*i*.6 in FIG. 5). Then, sends its public key, round-no, server's signature on the public key and round-no, local model signature, the local model, the hop-counter ($PubKey_i$, round-no, $S_i$, $SC_i$, $U_i$, hop-counter) to a randomly selected forwardee (selected in step 5.*i*.7 in FIG. 5) as seen in step 5.*i*.7.*a* in FIG. 5. Note that the client is flexible not to use a forwardee and can directly sent to the server. The clients send messages to the third entity, to detector, including sender client id, forwardee client id and hash of the concatenation of sender client public key, round-no, server's signature on the public key and round-no, local model signature, the local model (SC_ID, FC_ID, Hash ($PubKey_i$, round-no, $S_i$, $SC_i$, $U_i$)) as seen in step 5.*i*.7.*a*. 1 in FIG. 5. The client waits for an acknowledgment message with (Ack, SC_ID, FC_ID, Hash ($PubKey_i$, round-no, $S_i$, $SC_i$, $U_i$)) (the message is represented as Ack_SC-ID_FC-ID in step 5.*i*.7.*a*.3 in FIG. 5) from detector and if the detector has not sent the aforementioned ack message, then the client randomly chooses another client and sends the same packet.

5. After receiving a packet from a client, the forwardee sends a message (step 5.*i*.7.*a*.2 in FIG. 5) to the detector to acknowledge that the packet has been received. The message includes sender client id, forwardee client id and hash of the concatenation of the following parameters in the received packet: public key, round-no, server's signature on the public key and round-no, local model signature, the local model (SC_ID, FC_ID, Hash ($PubKey_i$, round-no, $S_i$, $SC_i$, $U_i$)). By this way, the detector ensures the sender client has sent the packet and forwardee client has received the packet by comparing this message with the message received from the sender client. Then the detector creates an acknowledgement (ack) message for sender client including acknowledgement, sender and receiver client ids and the hash received from the forwardee client. Then, the forwardee decreases the hop-counter in the received packet by 1 and checks whether the result equals to or less than a predetermined value (step 5.*i*.8 in FIG. 5). Note that the predetermined value is a parameter fixed at the beginning of FL and known by all the clients. If the check is successful, the forwardee sends the received public key, round-no, server's signature on the public key and round-no, local model signature, and the local model to the server as seen in step 5.*i*.8.*a* in FIG. 5. If the check is unsuccessful, the forwardee sends the received public key, round-no, server's signature on the public key and round-no, local model signature, the local model, and the new hop-counter to a randomly selected next forwardee. Note that the forwardee can send the packet to the server while the hop-counter is bigger than the threshold value. When the forwardee client sends the packet to the server or to another forwardee, the client sends a message including its client id, the server ID or the next forwardee client id and hash of the concatenation the following parameters in the received packet: public key, round-no, server's signature on the public key and round-no, local model signature, the local model (FC_ID, SC_ID or next FC_ID, Hash ($PubKey_i$, round-no, $S_i$, $SC_i$, $U_i$)), to the detector (step 5.*i*.8.*a*.1 in FIG. 5). The client waits for corresponding acknowledgement message from the detector (step 5.*i*.8.*a*.3 in FIG. 5). If the client doesn't get an ack message, then it chooses randomly another forwardee client and sends the same packet.

6. When the server receives a packet including a public key, round-no, server's signature on the public key and round-no, local model signature, and the local model, the server executes the following steps:

a. Checks whether the public key is in the table (a table that stores the received public keys) to ensure that a public key can be used only once. If it is on the table, the server drops the received data without processing it (step 5.*i*.9 in FIG. 5).

b. Verifies the signature of the received public key ($S_i$). If the signature is valid then stores the public key in the table with the round-no. Otherwise, drops the received data without processing it (step 5.*i*.10 in FIG. 5).

c. Checks whether the round-no is correct. Note that the server knows the current round no in FL and compares the FL round no with the received round-no (step 5.*i*.11 in FIG. 5).

d. Verifies the signature on the local model update. If the signature is valid, the server stores or processes the local model update to compute the new global model. Otherwise, drops the received data without processing it (step 5.*i*.11 in FIG. 5).

Also, the server sends a message to the detector as other clients when a packet has been received by the sender (step 5.*i*.8.*a*.2 in FIG. 5). Thus, the detector will ensure the packet reached its destination finally.

7. The server waits at least n-m data packets that pass the checks in step 6 where n is the number of clients and n-m is the number of clients required in the computation of the update of the global model. If that number is reached in the predefined time period, then the next round starts with step 1. The reason why we set a number 'm' is as follow: This solution allows execution of FL when at most m local model updates can be computed illegitimately by the m malicious clients who may want to prevent execution of FL.

Note that in the solution it is assumed that the detector and the server don't collude. The detector doesn't get the local update model packets however knows all the traffic by observing the messages from forwardee and receiver clients. Other clients and the server are not aware from this traffic since detector won't share this information.

In PCT/EP2022/069281 (TR 2021/013845), the idea can solve the problem of packet drops by malicious clients by setting m=0. In this case (m=0), the server will wait to receive packets from all the clients in each FL round. A client will be able to send only one packet due to the usage of blind signature. Since server waits n packets, a packet drop by a malicious client will halt the execution of the FL round and the server will restart the FL round after a predefined time period. However, setting m=0 allows malicious clients to execute a DOS attack because dropping at least one packet will lead the server to wait for n packets and restart the round because of missing packets. Thus, m can be tuned considering the number of packets allowed to be dropped and the possibility of DoS attacks. With this improvement herein, m can be chosen as 0 safely because when a malicious client drops a packet, it will be detected by the detector and the client will be excluded from the setting. But if the malicious client computes its local model signature illegitimately, then the client may prevent execution of FL if m=0. To prevent this DoS attack, m can be tuned considering possible number of malicious clients.

Also note that, to prevent traffic analysis, clients can use garbled data and random delays before forwarding the incoming data packets.

Thus, there is presented two different methods of determining whether a forwardee (e.g. second client node) has dropped packets forwarded by a first client node as part of a multi-hop FL process.

Turning now to other embodiments, FIG. 6 shows is a method 600 in a detector node in a communications network. The detector node is for monitoring messages sent between a first client node, a second client node and a Federated Learning, FL, server, as part of a FL process wherein, as part of the FL process, the first client node sends a local model update to the second client node for forwarding to the FL server.

Briefly, the method comprises: receiving 602 first information relating to the local model update sent from the first client node to the second client node; receiving 604 second information relating to the local model update as received or forwarded by the second client node; and comparing 606 the first information to the second information to determine whether the second client node correctly received or forwarded the first information relating to the local model.

The first node may be the originator of the local model update or may have received the local model update from another node for forwarding as part of the multi-hop FL process. The second client node may be a "forwardee" as described above, e.g. a hop in the multi-hop process. The FL server maintains the global copy of the model and may, for example co-ordinate the FL process.

As described above, the first information and/or the second information may be signed information.

In some embodiments, the step of receiving 602 first information relating to the local model update sent from the first client node to the second client node comprises: receiving a first message from the first client node comprising a first acknowledgement, ack, received by the first client node from the second client node to acknowledge receipt of the local model update. The step of receiving 604 second information relating to the local model update as received or forwarded by the second client node may comprise: receiving a second message from the second client node comprising a second acknowledgement, ack, received by the second client node from the FL server to acknowledge receipt of the local model update from the second client node, as forwarded to the FL server.

This was described above with respect to FIGS. 1, 2 and 3. For example, the first message may be message 3.1.13.a or 3.2.13.a in FIG. 3. The second message may be message 3.1.13.b or 3.2.13.b in FIG. 3.

The first acknowledgement may be a signed packet from the second client node. The signature is computed on H (PubKey$_i$, round-no, S$_i$, SC$_i$, U$_i$) and H is a hash function.

In some embodiments, the step of receiving first information relating to the local model update sent from the first client node to the second client node comprises: receiving a third message from the first client node comprising the hash of local model update as sent to the second client node by the first client node. The step of receiving second information relating to the local model update as received or forwarded by the second client node may then comprise: receiving a fourth message from the second client node comprising the hash of local model update as received by the second client node from the first client node.

The local model update may be hashed along with other parameters such as, for example, the concatenation of sender client public key, round-no, server's signature on the public key and round-no, local model signature, the local model (SC_ID, FC_ID, Hash (PubKey$_i$, round-no, S$_i$, SC$_i$, U$_i$)).

This was described above with respect to FIGS. 4 and 5 and it will be appreciated that the detail therein may also be applied to the method 600.

Generally, the step of comparing 606 the first information to the second information to determine whether the second client node correctly forwarded the first information relating to the local model may comprises determining whether the local model update was correctly received by the second client node.

Responsive to determining that the second client node correctly received or forwarded the first information relating to the local model, the method 600 may further comprise sending an acknowledgement message to the first client node to indicate that the second client node successfully received or forwarded the local model update to the FL server.

A method as in any one of the preceding embodiments wherein responsive to determining that the second client node incorrectly forwarded the first information relating to the local model, the detector may send messages to any of the first client node, second client node or FL server, informing the respective node. The detector may monitor the second client node and instigate removal of the second client node from the FL process if it is detected that it has repeatedly incorrectly forwarded or dropped model updates.

Figure 7:
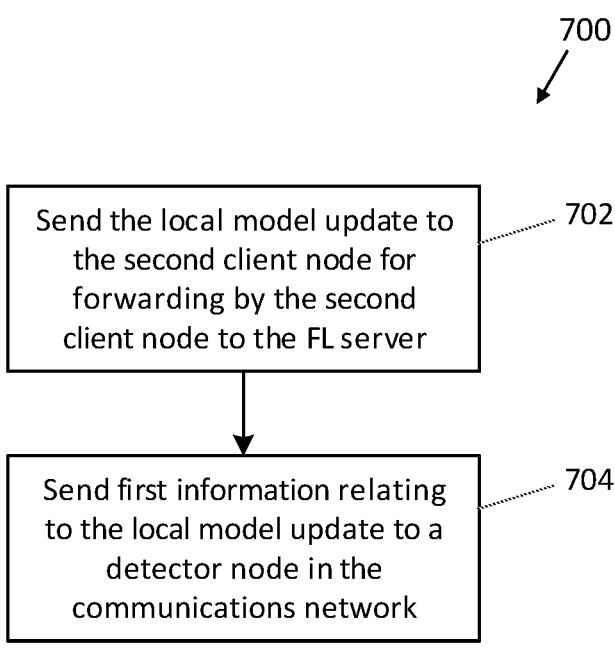
FIG. 7 shows a method according to some embodiments.

Turning now to other embodiments, FIG. 7 shows a method 700 in a first client node in a communications network. The first client node is involved in a Federated Learning, FL, process with a second client node and a Federated Learning, FL, server, wherein, as part of the FL process, the first client node sends a local model update to the second client node for forwarding to the FL server. The method 700 comprises: sending 702 the local model update to the second client node for forwarding by the second client node to the FL server; and sending 704 first information relating to the local model update to a detector node in the communications network.

The first information and/or the local model update may be signed.

The step of sending first information relating to the local model update to a detector node in the communications network may comprise: sending a first message to the detector node comprising a first acknowledgement, ack, received by the first client node from the second client node to acknowledge receipt of the local model update.

The method 700 may further comprise sending the local model update to a third client node (e.g., another forwardee) for forwarding by the third client node to the FL server, if no acknowledgement message is received from the second client node within a predefined time interval.

This was described above with respect to FIGS. 1 and 3 and it will be appreciated that the detail therein may also be applied to the method 700.

The step of sending first information relating to the local model update to a detector node in the communications network may comprise: sending a third message to the detector node comprising the hash of local model update as sent to the second client node by the first client node.

The method 700 may further comprise: sending the local model update to a third client node for forwarding by the third client node to the FL server, if no acknowledgement message is received from the detector node or from the second client. For example, if the detector does not send an acknowledgement, then this may indicate that the second client node has not forwarded or received the third message. The first client node may thus re-send to another client node instead.

In some embodiments the local model update is a result of training performed by the first client node as part of the FL process. E.g., the first client node may be the "originator" of the local model update. In other embodiments, the local model update was received by first client node from another client node for forwarding to the second client node. E.g., the first client node may be a forwardee node.

Figure 8:
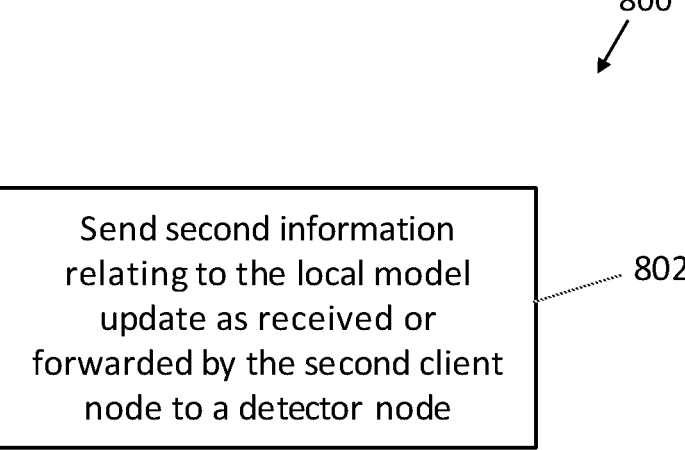
FIG. 8 shows a method according to some embodiments.

Turning now to other embodiments, FIG. 8 shows a method 800 in a second client node in a communications network. The second client node is involved in a Federated Learning, FL, process with a first client node and a Federated Learning, FL, server, wherein, as part of the FL process, the first client node sends a local model update to the second client node for forwarding to the FL server.

The second client node may be thought of as a "forwarder" or "forwardee" of the local model update, e.g., it may act as a hop in the multi-hop FL process.

In brief, the method 800 comprises: sending 802 second information relating to the local model update as received or forwarded by the second client node to a detector node. In some embodiments, the first information and/or the second information are signed.

In some embodiments, the step of sending second information relating to the local model update as received or forwarded by the second client node to a detector node comprises: sending a second message to the detector node comprising a second acknowledgement, ack, received by the second client node from the FL server to acknowledge receipt of the local model update from the second client node, as forwarded to the FL server.

This was described above with respect to FIGS. 1, 2 and 3 and the detail therein will be understood to apply equally to the method 800.

In other embodiments, the step of sending second information relating to the local model update as received or forwarded by the second client node to a detector node comprises sending a fourth message to the detector node comprising hash of the local model update as received by the second client node from the first client node.

This was described above with respect to FIGS. 4 and 5 and the detail therein will be understood to apply equally to the method 800.

The method 800 may further comprise forwarding the local model update to the FL server.

Figure 9:
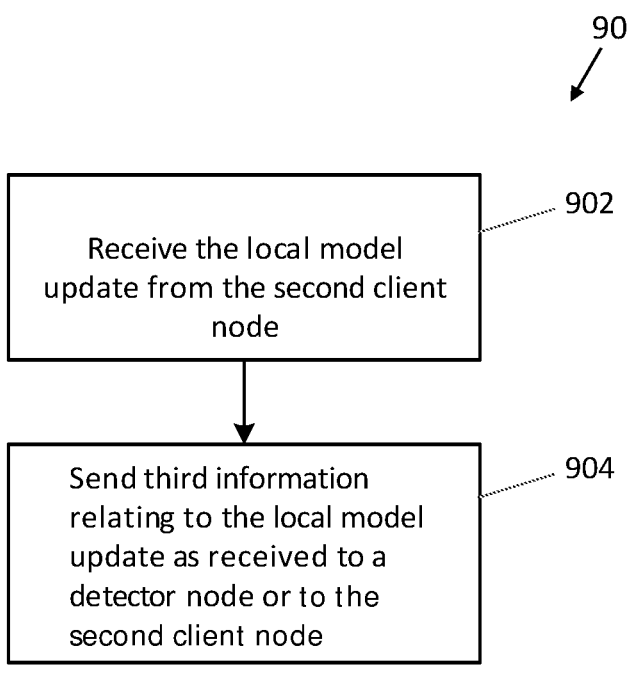
FIG. 9 shows a method according to some embodiments.

Turning to FIG. 9, there is a method 900 in a FL server, wherein the FL server is involved in a Federated Learning, FL, process with a first client node and a second client node, wherein, as part of the FL process, the first client node sends a local model update to the second client node for forwarding to the FL server, the method comprises: receiving 902 the local model update from the second client node; and sending 904 third information relating to the local model update as received to a detector node or to the second client node.

The third information may be signed.

The step of sending third information relating to the local model update as received or forwarded by the second client node to a detector node may comprise sending a fifth message to the second client node comprising a fourth acknowledgement, ack, to acknowledge receipt of the local model update from the second client node. This is illustrated in FIG. 3, message 3.*i*.8.*b* and the detail therein will be appreciated to apply equally to the method 900.

The method 900 may further comprise sending a sixth message to the detector node comprising hash of the local model update as received from the second client node. This is illustrated in FIG. 5, message 5.*i*.8.*a*.2 and the detail therein will be appreciated to apply equally to the method 900.

Generally, in any of methods 600, 700, 800 and 900, the local model update may be sent between client nodes and/or the FL server 110 in the form: (PubKey$_i$, round-no, S$_i$, SC$_i$, U$_i$, hop-counter) wherein PubKey$_i$ is a public key of the respective client node, used by the FL server in the FL process to verify the signed local model (throughout the document "signed local model" and "local model signature" are used in the same meaning) update, round-no is the round of training according to the FL process, SC$_i$ is a signed local model signed using a private key of a respective client node, U$_i$ is the local model, and hop-counter is the number changed by each forwarding node between the originator of the local model update and the FL-server.

Generally, the first information and/or the second information may comprise any of the following: id of the first client node, SC_ID; id of the second client node, FC_ID; hash of the concatenation of sender client public key, PubKey$_i$, round-no, server's signature S$_i$, on the public key and round-no, local model signature, SC$_i$, the local model, U$_i$: (SC_ID, FC_ID, Hash (PubKey$_i$, round-no, S$_i$, SC$_i$, U$_i$)).

Figure 10:
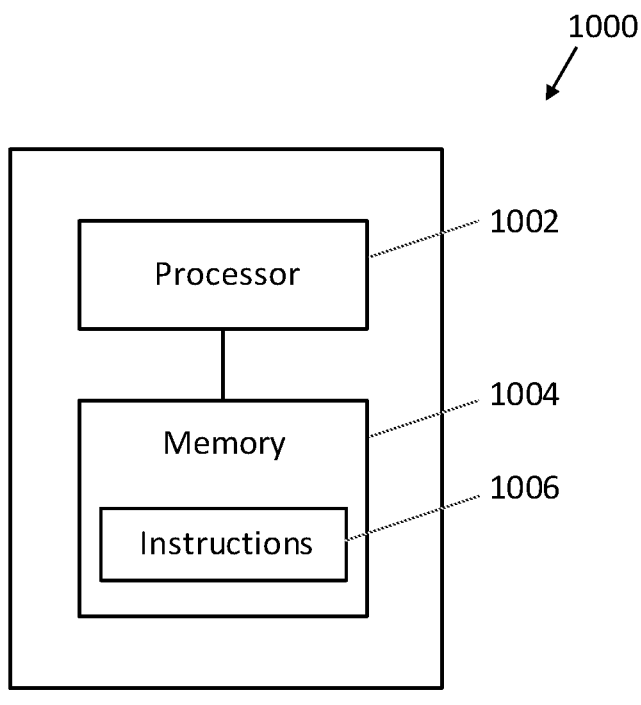
FIG. 10 shows a node according to some embodiments.

Turning now to other embodiments, embodiments herein may be performed by nodes in a communication network, such as client nodes and/or servers. FIG. 10 illustrates an example network node 1000 in a communications network according to some embodiments herein. Generally, the node 1000 may comprise any component or network function (e.g. any hardware or software module) in the communications network suitable for performing the functions described herein.

The node 1000 is configured (e.g. adapted, operative, or programmed) to perform any of the embodiments of the methods 600, 700 or 800 as described above. It will be appreciated that the node 1000 may comprise one or more virtual machines running different software and/or processes. The node 1000 may therefore comprise one or more servers, switches and/or storage devices and/or may comprise cloud computing infrastructure or infrastructure configured to perform in a distributed manner, that runs the software and/or processes.

The node 1000 may comprise a processor (e.g. processing circuitry or logic) 1002. The processor 1002 may control the operation of the node 1000 in the manner described herein. The processor 1002 can comprise one or more processors, processing units, multi-core processors or modules that are configured or programmed to control the node 1000 in the manner described herein. In particular implementations, the processor 1002 can comprise a plurality of software and/or hardware modules 1006 that are each configured to perform, or are for performing, individual or multiple steps of the functionality of the node 1000 as described herein.

The node 1000 may comprise a memory 1004. In some embodiments, the memory 1004 of the node 1000 can be configured to store program code or instructions 1006 that can be executed by the processor 1002 of the node 1000 to perform the functionality described herein. Alternatively or in addition, the memory 1004 of the node 1000, can be configured to store any requests, resources, information, data, signals, or similar that are described herein. The processor 1002 of the node 1000 may be configured to control the memory 1004 of the node 1000 to store any requests, resources, information, data, signals, or similar that are described herein.

It will be appreciated that a node 1000 may comprise other components in addition or alternatively to those indicated in FIG. 10. For example, in some embodiments, a node 1000 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 1002 of node 1000 may be configured to control such a communications interface to transmit to and/or receive from other nodes or network functions requests, resources, information, data, signals, or similar.

For example, in some embodiments, the node 1000 may comprise a FL server 110. A FL server may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC) such as NWDAF (Network Data Analytics Function).

In some embodiments, the node 1000 may be a detector node as described above. A detector node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes suitable to perform the methods attributed to the detector node include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC) such as NWDAF (Network Data Analytics Function).

As described above, in some embodiments, the detector node and FL server may be managed by different parties (e.g. different operators or vendors in the communications network). This may be beneficial to prevent collusion between the FL server and detector node.

In some embodiments, the node 1000 may comprise a client node, such as the first client node 104, second client node 106, or third client node 108 referred to above. Client nodes can be network functions in the core network, which, for example, utilize NWDAF for analytics. A client node could also comprise, for example a user equipment, UE. A UE may comprise a device capable, configured, arranged and/or operable to communicate wirelessly with network nodes and/or other wireless devices. Unless otherwise noted, the term UE may be used interchangeably herein with wireless device (WD). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc., A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

Some Other Use Cases:

The use of FL in vertical industries is also advancing. For autonomous vehicle use cases where massive amount of data is produced variety of sensors, FL can be used for ML based vehicular applications such as vehicle management (e.g. autonomous driving) or traffic management (e.g., infotainment and route planning). In such cases vehicles act as FL clients, produce data on the edge and collaborate on training task with the FL server (which can be a cloud server, or one of the vehicles act as a server). Similarly, in smart manufacturing, FL is also promising to improve ML tasks among several connected edge/Industrial IoT devices like connected robots, smart actuators etc. FL can also be applied in different business use cases between companies (e.g., industrial business partners, banks, healthcare companies) when they don't want to share sensitive (business related or customer related data) yet desire to have a common ML model beneficial for all contributing companies.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein, such as the methods 600, 700, or 800.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g., at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the invention, from a study of the drawings, the disclosure and the appended embodiments. In the embodiments, the word "comprising" does not exclude other elements or steps, and the indefinite article "a" or "an" does not exclude a plurality. A single processor or other unit may fulfil the functions of several items recited in the embodiments. The mere fact that certain measures are recited in mutually different dependent embodiments does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the embodiments should not be construed as limiting the scope.

The invention claimed is:

1. A method performed by a detector node configured to monitor messages sent between a first client node, a second client node, and a Federated Learning (FL) server in a communication network, the method comprising:

receiving first information relating to a local model update, for the FL process, as sent from the first client node to the second client node;

receiving second information relating to the local model update as received by the second client or forwarded by the second client node to the FL server; and comparing the first information to the second information to determine whether the second client node correctly received or forwarded the first information relating to the local model, wherein:

the local model update is in the form: (PubKey$_i$, round-no, S$_i$, SC$_i$, U$_i$, hop-counter);

round-no indicates a training round, of the FL process, that is associated with the local model update;

SC$_i$ is a local model signature based on a private key of the first client node;

PubKey$_i$ is a public key of the first client node, usable by the FL server to verify the local model signature, SC$_i$:

U$_i$ is the local model; and hop-counter is a number of forwarding nodes between an originator of the local model update and the FL server.

2. A method as in claim 1 wherein one or more of the first information and the second information is signed.

3. A method as in claim 1 wherein:

receiving first information relating to the local model update as sent from the first client node to the second client node comprises receiving from the first client node a first message that includes a first acknowledgement (ACK) received by the first client node from the second client node to acknowledge receipt of the local model update; and receiving second information relating to the local model update as received or forwarded by the second client node comprises receiving from the second client node a second message that includes a second ACK received by the second client node from the FL server to acknowledge receipt of the local model update from the second client node, as forwarded to the FL server.

4. A method as in claim 1, wherein:

receiving first information relating to the local model update sent from the first client node to the second client node comprises receiving from the first client node a third message that includes a hash of the local model update as sent to the second client node by the first client node; and receiving second information relating to the local model update as received or forwarded by the second client node comprises receiving from the second client node a fourth message that includes a hash of the local model update as received by the second client node from the first client node.

5. A method as in claim 1, further comprising, responsive to determining that the second client node correctly received or forwarded the first information relating to the local model update based on the comparing, sending a third acknowledgement message to the first client node to indicate that the second client node correctly received or forwarded the local model update to the FL server.

6. A method as in claim 1, further comprising, responsive to determining that the second client node incorrectly forwarded the first information relating to the local model update, monitoring the second client node or initiating removal of the second client node from the FL process.

7. A detector node configured to monitor messages sent between a first client node, a second client node, and a Federated Learning (FL) server in a communication network, wherein the message are part of a FL process in which the first client node sends a local model update to the second client node for forwarding to the FL server, wherein the detector node comprises:

a memory comprising computer-executable instructions; and a processor configured to communicate with the memory and to execute the instructions, wherein execution of the instructions causes the detector node to perform the method of claim 1.

8. A method performed by a first client node configured to participate in a Federated Learning (FL) process with a second client node and a FL server in a communications network, the method comprising:

sending a local model update, for the FL process, to the second client node for forwarding by the second client node to the FL server; and sending first information relating to the local model update to a detector node in the communications network, wherein:

the local model update is in the form: (PubKey$_i$, round-no, S$_i$, SC$_i$, U$_i$, hop-counter);

round-no indicates a training round, of the FL process, that is associated with the local model update;

SC$_i$ is a local model signature based on a private key of the first client node;

PubKey$_i$ is a public key of the first client node, usable by the FL server to verify the local model signature, SC$_i$:

U$_i$ is the local model; and hop-counter is a number of forwarding nodes between an originator of the local model update and the FL server.

9. A method as in claim 8, wherein the first information relating to the local model update comprises one or more of the following: a hash of the local model update, and a signed local model update.

10. A method as in claim 8, wherein sending first information relating to the local model update to a detector node in the communications network comprises sending to the detector node a first message that includes a first acknowledgement (ACK) received by the first client node from the second client node to acknowledge receipt of the local model update.

11. A method as in claim 8, further comprising one or more of the following:

when no acknowledgement message for the local model update is received from the second client node within a predefined time interval, sending the local model update to a third client node for forwarding by the third client node to the FL server; and when no acknowledgement message for the first information is received from the detector node, sending the local model update to a third client node for forwarding by the third client node to the FL server.

12. A method as in claim 8, wherein sending first information relating to the local model update to a detector node in the communications network comprises sending to the detector node a third message that includes a hash of the local model update as sent to the second client node by the first client node.

13. A method as in claim 8, wherein one of the following applies:

the local model update is a result of training performed by the first client node as part of the FL process; or the local model update was received by first client node from another client node for forwarding to the second client node.

14. A first client node configured to participate in a Federated Learning (FL) process with a second client node and an FL server in a communication network, wherein the first client node comprises:

a memory comprising computer-executable instructions; and a processor configured to communicate with the memory and to execute the instructions, wherein execution of the instructions causes the first client node to perform the method of claim 8.

15. A method performed by a second client node configured to participate in a Federated Learning (FL) process with a first client node and a Federated Learning (FL) server in a communications network, wherein the method comprises:

receiving a local model update, for the FL process, from the first client node and forwarding the local model update to the FL server; and sending to a detector node second information relating to the local model update as received or forwarded by the second client node, wherein:

the local model update is in the form: (PubKey$_i$, round-no, S$_i$, SC$_i$, U$_i$, hop-counter);

round-no indicates a training round, of the FL process, that is associated with the local model update;

SC$_i$ is a local model signature based on a private key of the first client node;

PubKey$_i$ is a public key of the first client node, usable by the FL server to verify the local model signature, SC$_i$;

U$_i$ is the local model; and hop-counter is a number of forwarding nodes between an originator of the local model update and the FL server.

16. A method as in claim 15 wherein the second information is signed.

17. A method as in claim 15, wherein sending the second information to the detector node comprises sending to the detector node a second message that includes a second acknowledgement (ACK) received by the second client node from the FL server to acknowledge receipt of the local model update from the second client node.

18. A method as in claim 15, wherein sending the second information to the detector node comprises sending to the detector node: a fourth message that includes a hash of the local model update as received by the second client node from the first client node.

19. A second client node configured to participate in a Federated Learning (FL) process with a second client node and an FL server in a communication network, wherein the second client node comprises:

a memory comprising computer-executable instructions; and a processor configured to communicate with the memory and to execute the instructions, wherein execution of the instructions causes the second client node to perform the method of claim 15.

* * * * *